United States Patent [19]

Sing

[11] Patent Number: 4,768,914
[45] Date of Patent: Sep. 6, 1988

[54] STORAGE SYSTEM

[76] Inventor: Peter Sing, 43 Donny Brook Rd., Scarsdale, N.Y. 10583

[21] Appl. No.: 106,386

[22] Filed: Oct. 9, 1987

Related U.S. Application Data

[63] Continuation-in-part of Ser. No. 818,253, Jan. 13, 1986, abandoned.

[51] Int. Cl.$^4$ ............................................. B65G 1/133
[52] U.S. Cl. .................................... 414/237; 414/235; 414/239; 414/286; 414/278; 414/37; 414/90; 414/119; 198/300; 198/465.2
[58] Field of Search ............... 414/233, 232, 234, 235, 414/119, 90, 236, 237, 238, 239, 240, 286, 274, 245, 241, 252, 253, 231, 278, 37; 104/48, 49; 198/465.2, 457, 787

[56] References Cited

U.S. PATENT DOCUMENTS

| | | |
|---|---|---|
| 2,258,530 | 10/1941 | Auger et al. ........................ 414/237 |
| 2,667,980 | 2/1954 | Dawson . |
| 2,667,983 | 2/1954 | Billings . |
| 2,712,875 | 7/1955 | Leopold ............................. 414/239 |
| 2,818,186 | 12/1957 | Sinclair . |
| 2,840,248 | 6/1958 | Grove et al. . |
| 2,846,186 | 8/1958 | Smith . |
| 2,876,913 | 3/1959 | Roth et al. . |
| 2,890,802 | 6/1959 | Alimanestiano . |
| 2,903,120 | 9/1959 | Thomas ......................... 198/465.2 X |
| 2,916,166 | 12/1959 | Bigler . |
| 2,967,634 | 1/1961 | Bogar et al. . |
| 3,011,660 | 12/1961 | Shutt . |
| 3,079,015 | 2/1963 | Sinclair et al. ....................... 414/239 |
| 3,091,349 | 5/1963 | Roth . |
| 3,115,257 | 12/1963 | Kubik ............................. 414/236 X |
| 3,156,366 | 11/1964 | Shutt . |
| 3,159,293 | 12/1964 | Bianca . |
| 3,161,303 | 12/1964 | Burrows . |
| 3,363,784 | 1/1968 | Roth . |
| 3,616,945 | 11/1971 | Gynne ................................. 414/239 |
| 3,854,610 | 12/1974 | Carder ............................. 198/300 X |
| 3,896,955 | 7/1975 | Collins et al. . |
| 4,005,785 | 2/1977 | Manaugh . |
| 4,039,089 | 8/1977 | Kochanneck . |
| 4,217,070 | 8/1980 | Gröger ................................. 414/239 |
| 4,557,656 | 12/1985 | Ouellette ........................ 414/118 X |

FOREIGN PATENT DOCUMENTS

| | | | |
|---|---|---|---|
| 629574 | 10/1961 | Canada ............................. 414/237 |
| 1244432 | 9/1960 | France ............................. 414/236 |

Primary Examiner—Frank E. Werner
Attorney, Agent, or Firm—Nathaniel Altman

[57] ABSTRACT

A storage system comprises a building structure having an array of contiguous storage spaces on each of at least one level. A plurality of movable storage platforms, on which such cargo as automobiles, shipping containers and the like may be loaded, is available, each individual platform to be moved into, stored or moved out of any one of the storage spaces. Each storage space is provided with a first apparatus for supporting and moving one of the storage platforms in a longitudinal direction, and with a second apparatus for supporting and moving a storage platform in a transverse direction. The two supporting and moving apparatus in each space may be alternately or selectively placed in contact with, and actuated to move, the storage platform therein, thus shifting the platform with its cargo in the direction desired into or out of the storage space. Remote and automatic programmed control of storage and retrieval movements of the cargo being handled may be included.

10 Claims, 6 Drawing Sheets

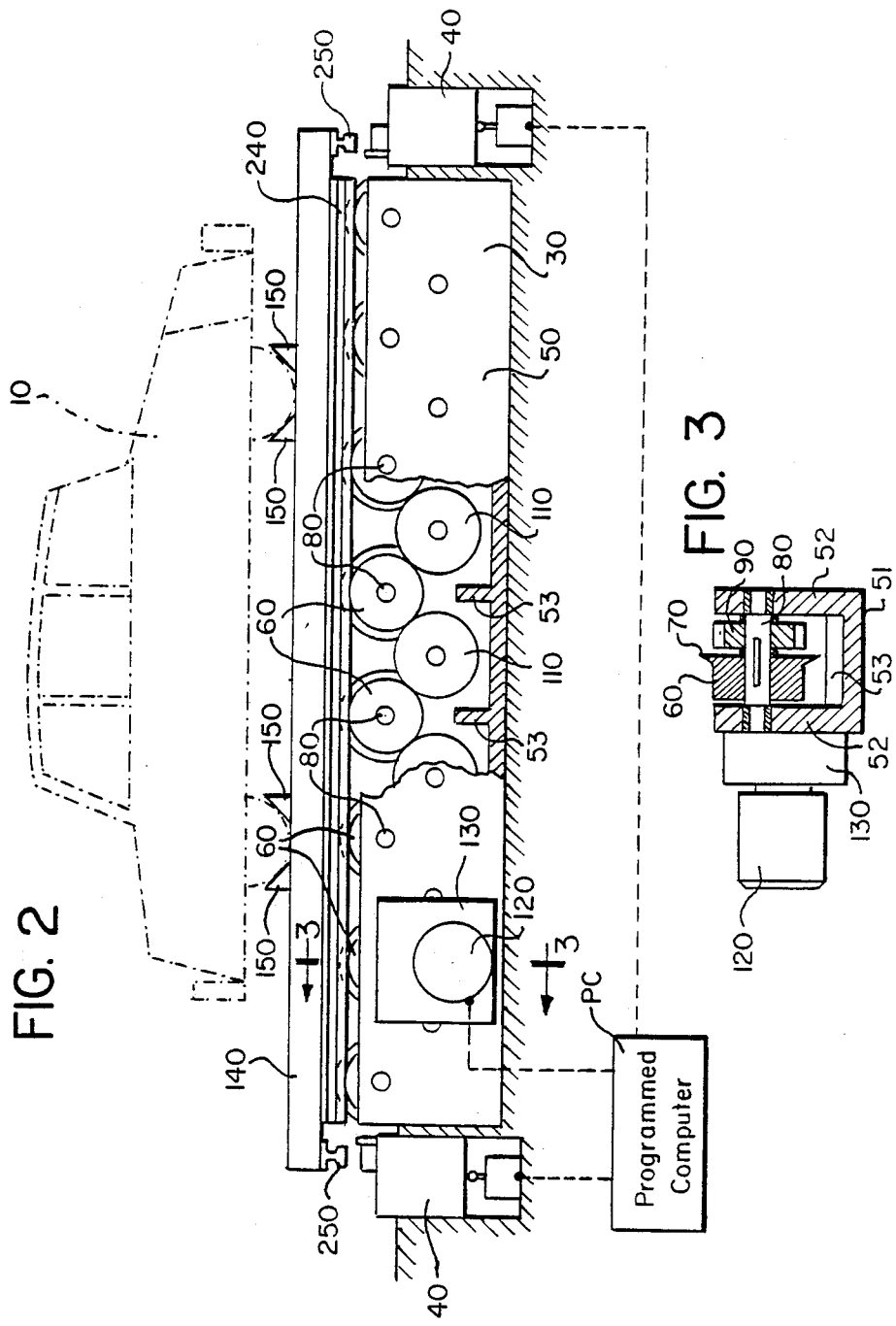

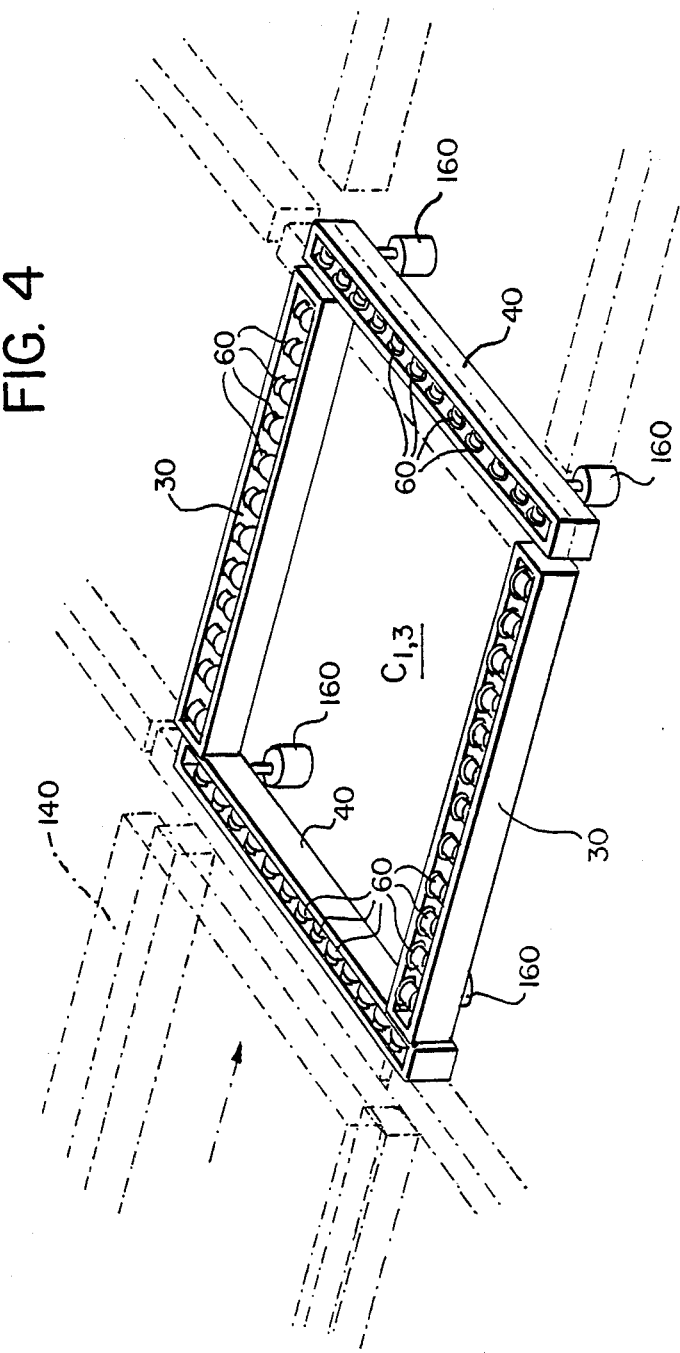

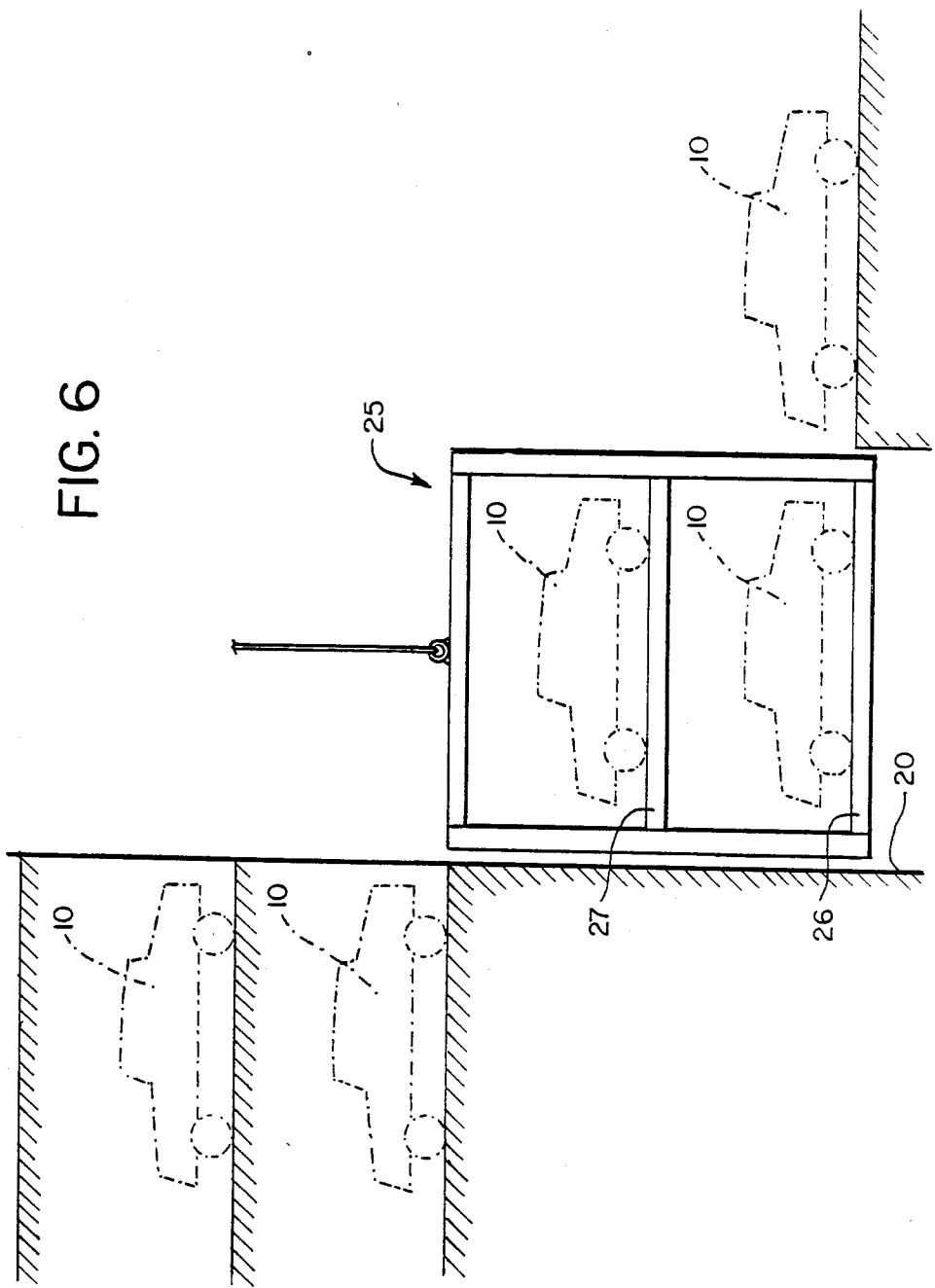

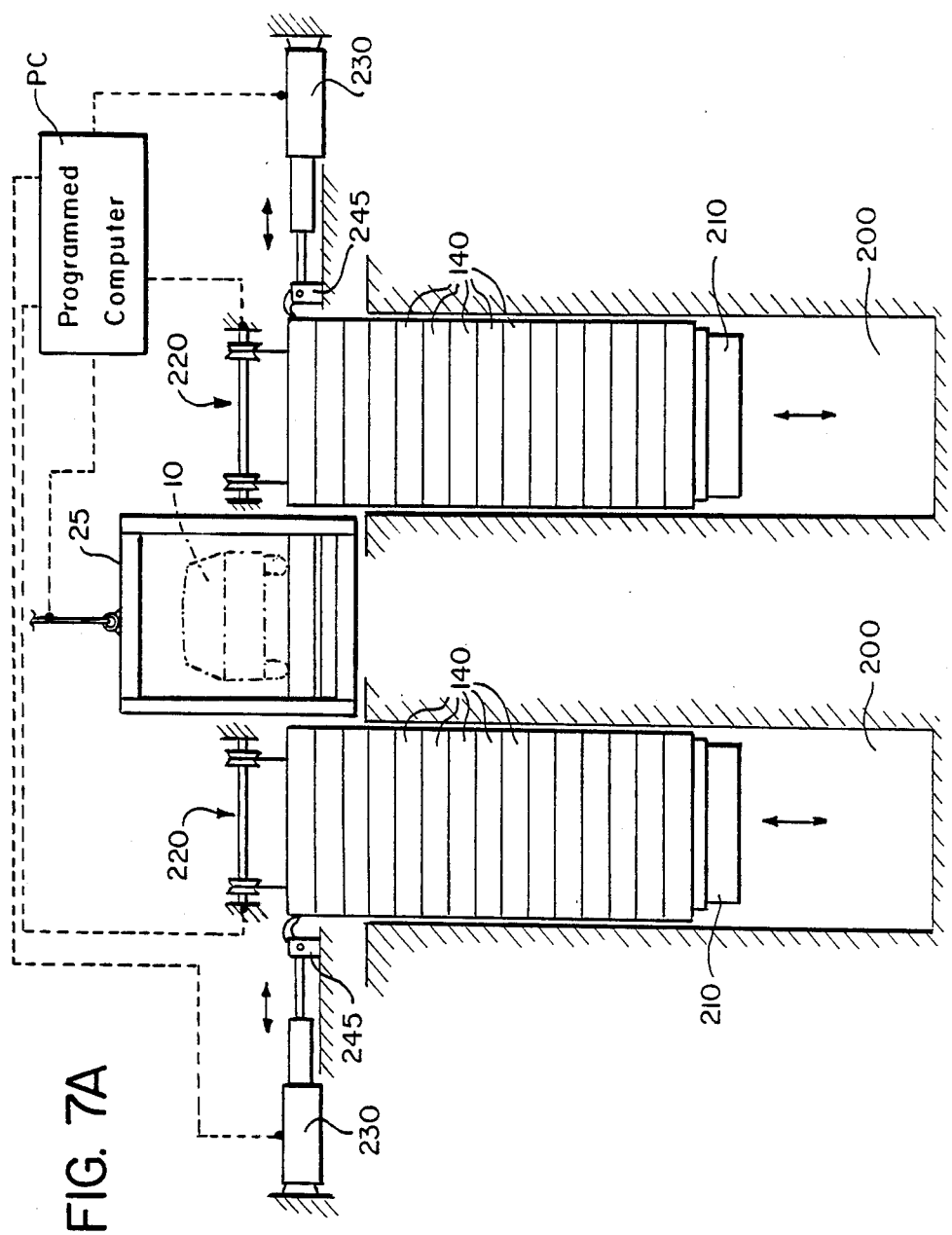

STORAGE SYSTEM

This is a continuation-in-part application based on Application Ser. No. 818,253, filed Jan. 13, 1986, titled "Storage System", now abandoned.

BACKGROUND OF THE INVENTION

This invention relates to a storage system, and more specifically to a storage system usable for the compact storage and expeditious efficient retrieval of cargo containers, automobiles and many other comparable items of cargo.

As is well known, the cost of land in metropolitan and industrial areas is relatively expensive. In these areas, there has long been a need to maximize the effective utilization of space for storage, and thus to minimize the amount of land and the attendant cost required.

SUMMARY OF THE INVENTION

The storage system of the present invention for moving and storing cargo such as automobiles, cargo containers and the like comprises an array of contiguous storage spaces on each level within a structure, each storage space being provided with a first means for supporting and moving a storage platform back and forth in a longitudinal direction, and a second means for supporting and moving a storage platform from side to side in transverse direction. The two supporting and moving means in each space may be alternately or selectively placed in supportive contact with the storage platform to be moved into or out of a specific storage space and appropriate motive means may be applied to the selected means for supporting and moving the storage platform and its cargo into position as desired. All storage and retrieval movements of the storage platform are remotely controlled and may be programmed for automatic operation.

The present invention, including various embodiments, advantages and uses are now described in detail in connection with the illustrative accompanying drawings wherein:

SHORT FIGURE DESCRIPTION OF THE DRAWINGS

FIG. 2 is a front elevational view, partially broken away, of a storage platform and the means for supporting and moving the platform;

FIG. 3 is a vertical sectional view taken along line 3—3 of FIG. 2, showing a preferred embodiment of a drive unit of the support and moving means of this invention;

FIG. 4 is an isometric view showing the arrangement of the support and moving means for longitudinal and transverse cargo movement for a single storage space;

FIG. 6 is a schematic front view of a two-level elevator usable in connection with this invention;

FIG. 7A shows a schematic front elevational view of an apparatus for the storage and retrieval of the storage platforms of this invention;

DESCRIPTION OF THE PREFERRED EMBODIMENTS

Figure 1:
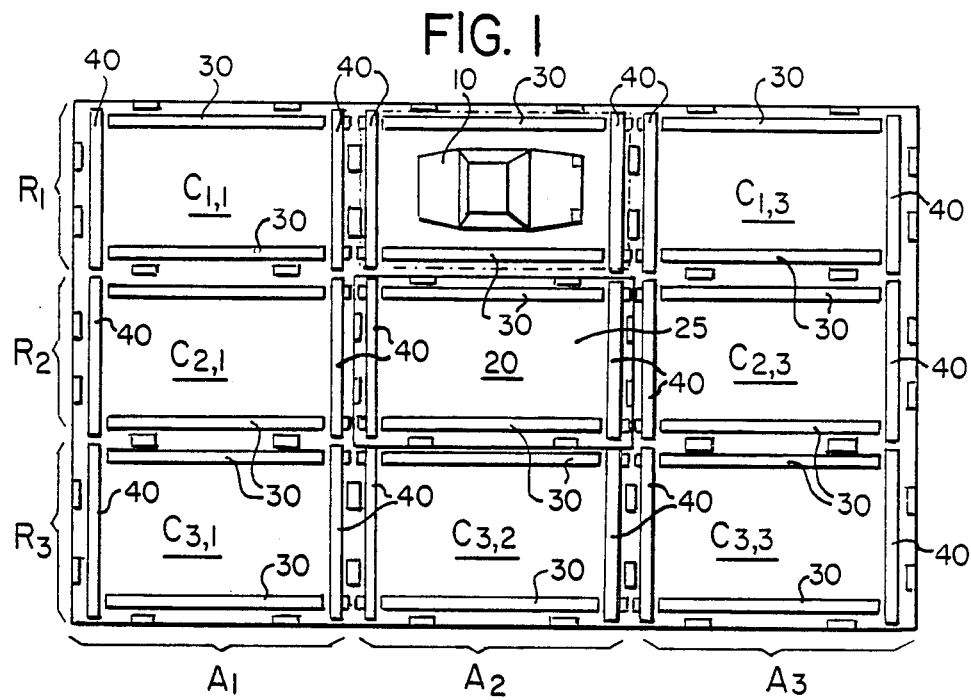
FIG. 1 is a floor plan view of one level of a preferred embodiment of the storage system of this invention.

FIG. 1 shows the floor plan of one level of a storage structure in accordance with this invention. Generally, a facility using this storage system can have one or more levels and have the capacity for cargo to be delivered to and retrieved from a particular level by means of an elevator or hoist system. The term "cargo" herein refers to any items for which storage is required, such as automobiles, truck cargo containers and the like.

The basic unit of storage in this invention is the storage space, designated by the letter C in FIG. 1. The floor plan of FIG. 1 comprises an array of storage spaces made up of a number of rows and aisles of the storage spaces, with the rows extending in the longitudinal direction (horizontally in FIG. 1) and the aisles extending in the transverse direction (vertically in FIG. 1). The location of each row R is identified by a subscript; thus the first row is designated in FIG. 1 as row $R_1$, the second row $R_2$ and so on. Similarly, the location of each aisle A is also identified by a subscript; thus the first aisle is designated in FIG. 1 as aisle $A_1$, the second aisle as aisle $A_2$ and so on.

A particular storage space C in the array is identified by a two-number subscript, for example: $C_{x,y}$. The first number in the subscript defines the row in which the storage space is located and the second subscript denotes the aisle in which the space is located. Thus, storage cell $C_{2,3}$ describes the storage space located in row $R_2$ and aisle $A_3$.

Elevator shaft 20 is shown at position 2,2 of FIG. 1 for delivery to and retrieval from the level shown, which is only one of a multi-level storage structure. A vehicle 10 is shown stored in space $C_{1,2}$.

Structurally, each storage space C contains a means for supporting and moving a storage platform in a longitudinal direction and a means for supporting and moving the platform in a transverse direction; these two means provide the ability to move cargo loaded on a storage platform into and out of the storage space in either of two directions. Specifically, the first means for support and longitudinal movement comprises two longitudinal roller support units 30 extending along the front and rear peripheral edges respectively of storage space C; the second means for support and transverse movement comprises two transverse roller support units 40 extending along the side peripheral edges of storage space C.

The structure of each roller support unit 30 is identical to that of each transverse roller support unit 40. As an example, a longitudinal roller support unit 30 is shown in FIG. 2. Each roller support unit comprises a frame member 50, which is U-shaped and formed of a horizontal web 51 connecting two vertically disposed flanges 52. A plurality of support-drive wheels 60 are mounted on frame member 50. Each drive wheel 60 is supported for free rotation between the flanges 52 of frame member 50 on a shaft 80 in such a way that a portion of drive wheel 60 protrudes upwardly beyond the upper edges of flange 52. Reinforcing ribs 53 span the space between flanges 52 under each drive wheel 60 to strengthen frame member 50.

As can be seen best in FIGS. 2 and 3, each drive wheel 60 has a guide flange 70 on its inner edge. Also mounted on each shaft 80 is a pinion 90. The pinions 90 of adjacent shafts 80 are commonly and engagingly meshed with drive transfer gear 110. At least one of the shafts 80 on frame member 50 is driven by drive motor 120 through gear box 130, as shown in FIG. 3. Because each pair of adjacent drive wheels 60 is mechanically coupled together by a drive transfer gear 110, it can readily be seen that all drive wheels 60 are driven by drive motor 120. Drive motor 120 may take any one of a wide variety of forms, and may be powered alternatively by hydraulics, pneumatics, electricity, electromagnetism or petrochemical fuels, the choice of which may depend on local energy costs, anticipated service environment or other such factors. The use of superconducting electromagnets as an alternate power source is envisioned.

In place of drive transfer gears 110, drive wheels 60 may be operatively linked for simultaneous rotation to drive motor 120 by means of any other well-known power transfer system, such as a shaft drive or chain drive. Simultaneous rotation may also be achieved by providing an endless belt around drive wheels 60.

Cargo to be stored, exemplified by automobile 10 in FIGS. 1 and 2, is moved to and from, and stored in, storage spaces C on storage platforms 140. Each storage platform 140 remains in the storage space assigned throughout the time the cargo is being stored therein. Each storage platform 140 may be adapted to accomodate a specific type of cargo; thus, for example, storage platform 140 in FIG. 2 is equipped as an automobile carrier with chocks 150 to position securely automobile 10 on platform 140.

Figure 5A:
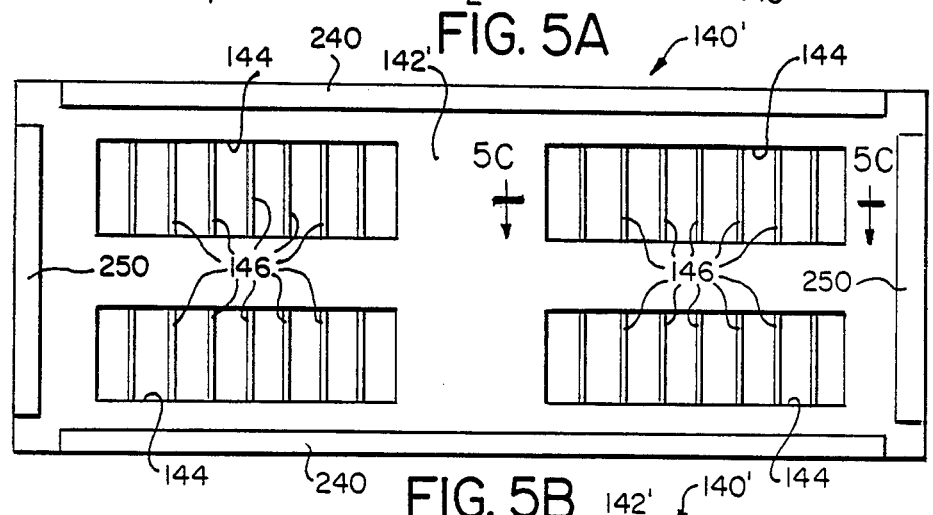
FIG. 5A is a bottom plan view of a storage platform showing the arrangement of guide rails thereon.
Figure 5B:
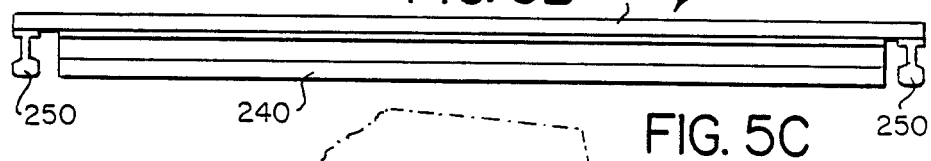
FIG. 5B is a front elevational view of the platform of FIG. 5A.
Figure 5C:
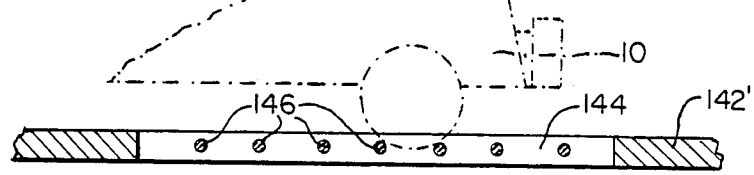
FIG. 5C is a longitudinal sectional view taken along line 5C—5C of FIG. 5A, showing the arrangement of automobile wheel support bars on the storage platform.

Platform 140', as shown in FIGS. 5A–5C, is equipped with structural elements which guide and control its movement. Specifically, storage platform 140' has horizontally disposed substantially flat chassis 142', the underside of which carries depending rails to be supported by and moved on support-drive wheels 60 in storage spaces C. The arrangement of these rails, shown in FIGS. 5A and 5B, comprises longitudinal guide rails 240 and transverse guide rails 250 mounted on the underside of storage platform chassis 142'. Longitudinal guide rails 240, parallelly positioned along the front and rear edges of platform chassis 142' and spaced apart to correspond to the spacing of paired longitudinal roller support units 30, thereby can mate with and are securely supported on drive wheels 60 of both longitudinal roller support units 30 of storage space C. Guide flanges 70 of support-drive wheels 60 guide the movement of longitudinal rails 240, which carry storage platform 140' and its cargo. In like manner, transverse guide rails 250, parallelly positioned along the side edges of platform chassis 142' and spaced apart to correspond with the spacing of paired transverse roller support units 40, thereby can mate with and be securely supported on drive wheels 60 of both transverse roller support units 40 of storage space C, guided in movement by flanges 70 of support drive wheels 60.

Cargo storage platform 140', as shown in FIGS. 5A–5C, is adapted to support, store and move automobile 10. In place of chocks 150 of platform 140 (FIG. 2), platform chassis 142' contains four apertures 144 arranged so that the wheels of automobile 10, when positioned on storage platform 140', will correspond to apertures 144. The wheels of automobile 10 may be supported within apertures 144 by making the length of each aperture smaller than the diameter of the tires of automobile 10, or by spanning each aperture 144 with at least one support bar 146. The distance between wheel support bars 146, and the distance between the forward or rearward edge of any opening 144 and the support bar 146 immediately adjacent that edge, should be smaller than the diameter of the tires of automobile 10 to be supported and stored on platform 140'.

FIG. 4 shows the arrangement of roller support units 30 and 40 of typical storage space $C_{1,3}$. Longitudinal roller support units 30 are of fixed elevation, being rigidly mounted on the storage building structure; in contrast, the elevation of transverse roller support units 40 is variable and can be changed by actuating jacks 160, a pair of which connect the storage building structure and the web 51 of frame member 50 of each transverse roller support unit 40. Jacks 160 can move each transverse roller support unit from a first position, where drive wheels 60 of unit 40 are lower in elevation than drive wheels 60 of storage space $C_{1,3}$'s roller support units 30, to a second position raised to where wheels 60 of unit 40 are higher in elevation than drive wheels 60 of units 30. Obviously, the jacks 160 in each storage space C are operated in unison and driven in any of many ways, such as hydraulics, pneumatics, or a worm and screw arrangement powered by a hydraulic, pneumatic, electric, steam or internal combustion motor or engine.

The elevation of drive wheels 60 of transverse roller support units 40 relative to the elevation of drive wheels 60 of longitudinal units 30 determines whether support plate 140 and cargo mounted thereon will be moved in the longitudinal or transverse direction. Thus, for example, if it is desired to move a support platform 140 from storage space $C_{1,2}$ to space $C_{1,3}$, transverse roller units 40 are kept in their lower first position, and platform 14C therefore is supported on wheels 60 of longitudinal roller units 30. By actuating motors 120 of units 30 in both spaces $C_{1,2}$ and $C_{1,3}$, platform 140 is moved into the latter space. If it is desired to move the same storage platform 140 from space $C_{1,3}$ to space $C_{2,3}$, transverse roller support units 40 in both spaces are raised by jacks 160 to their second elevated operative position, whereby platform 140 is now supported by wheels 60 of transverse units 40 in space $C_{1,3}$. Actuation of drive motors 120 in both storage spaces results in the shifting of storage platform 140 and its cargo from space $C_{1,3}$ to space $C_{2,3}$.

It may be noted that the roles of roller support units 30 and 40 may be reversed, with transverse support units 40 being fixed in height, while longitudinal support units 30 may be equipped with jacks 160 for bringing wheels 60 of units 30 in and out of supportive operative contact with rails 240 of storage platform 140.

Instead of using one drive motor 120 for each roller support unit 30 or 40, it is possible to have a single motor power more than one unit. Thus, for a pair of longitudinal roller support units 30 within a given storage space, one unit 30 with an extended shaft to transfer power to the other unit 30. The same may be done for each pair of transverse roller support units 40 within each storage space C, with the addition of whatever devices, such as universal joints, necessary to accomodate vertical movement of units 140 when their jacks 160 are actuated. Mechanically linking the pairs of roller support units in a given storage space is desirable to ensure that drive wheels 60 of both units operate in unison by being rotated at precisely the same rate.

Elevator shaft 20 contains a lifting member capable of supporting a storage platform 140 and its cargo, designated elevator car 25 (FIG. 6). Elevator car 25 can be moved between levels of a storage building structure by means of cables affixed to the top of elevator car 25, looped around power-operated drive pulleys and supporting at their opposite ends movable counterweights located in shaft 20. A pair of longitudinal roller support units 30 and a pair of transverse roller support units 40 identical to those in each storage space C are mounted in elevator car 25, all functioning in the manner described above.

Thus, the cargo to be stored, positioned on a storage platform 140, may be brought to the appropriate level by elevator car 25 in elevator shaft 20.. At this point, by actuating drive wheels 60 of either longitudinal units 30 or transverse units 40 mounted in elevator car 25, platform 140 may be moved, according to the floor plan of FIG. 1, into any one of storage spaces $C_{2,1}$, $C_{2,3}$, $C_{3,2}$ or $C_{1,2}$. Further movement of platform 140 is then accomplished by actuating the appropriate roller support units in the space containing platform 140 and the adjacent space to which it is to be moved. Further shifting of platform 140 may be carried out in this manner until platform 140 is located in the storage space intended for it to remain; retrieval of a platform 140 and its cargo is performed in an exactly analogous way.

The elevator car 25 shown in FIG. 6 is characterized by having a lower level 26 and an upper level 27, each having pairs of longitudinal and transverse roller support units 30 and 40, respectively, for the handling and transfer of platforms 140. The spacing between upper level 27 and lower level 26 of elevator 25 corresponds to that between the different levels of the multi-level storage building structure in which elevator 25 is used.

Elevator car 25 facilitates storage and retrieval of cargo in a multi-level storage structure. For example, a unit of cargo (automobile 10 in FIG. 6) is first moved into upper level 27 of car 25, which is then raised one level and another automobile 10 is loaded onto lower level 26. Elevstor car 25 is then raised to the two desired building storage levels. The two platforms 140 on which the two automobiles are supported may be shifted simultaneously from levels 26, 27 of elevator car 25 and on to storage space locations on each storage level as desired.

A similar procedure may be followed for the retrieval of cargo; elevator car 25 is first raised to be positioned appropriately at the two levels being serviced and two automobiles 10 on platforms 140 are simultaneously moved into elevator car levels 26, 27. Car 25 is then lowered so that automobile 10 on lower elevator level 26 can be unloaded. Further lowering of car 25 thereafter permits removal of automobile 10 from upper elevator level 27.

Storage platforms 140 may be left in storage spaces C when not in use. Alternatively, in situation where the time between successive storage or retrieval operations is desirably kept to a minimum, a storage system for storage platforms 140 may be installed to insert or extract platforms 140 into or from elevator car 25 proximate the point where cargo is brought to or retrieved from elevator car 25.

Figure 7B:
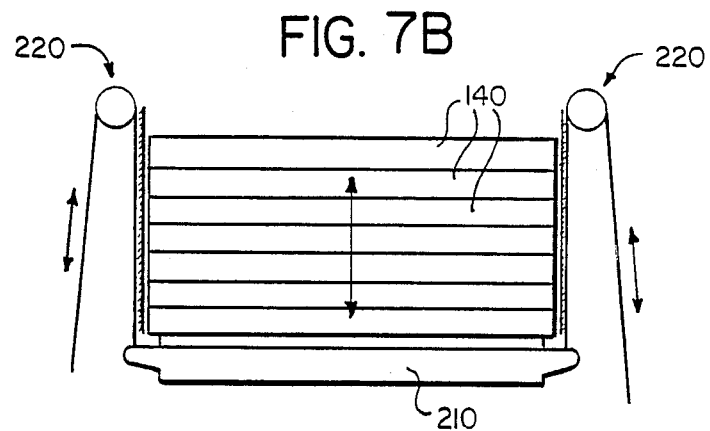
FIG. 7B is a schematic side elevational view of the apparatus of FIG. 7A.

FIGS. 7A–7D illustrate such a storage system for platforms 140. In FIG. 7A, a storage well 200 is located on each of the two sides of elevator shaft 20 and elevator car 25, which is shown in this drawing positioned at the point where it both receives cargo for storage and delivers cargo from storage within the storage structure. Each platform storage well 200 is capable of storing platforms 140 in a stack. Stored platforms 140 are supported by a tray 210 in each well 200. Each tray 210 can be vertically positioned by a tray hoist system 220 so that the topmost platform 140 in the stack is at the same elevation as the lowest position of elevator car 25. Tray hoist system 220 may comprise, as shown, cables affixed to trays 210, looped around power-driven pulleys and supporting at their opposite ends movable counterweights suspended in storage wells 200. Other tray hoist mechanisms of conventional types may be substituted, as would be evident to one skilled in the art.

Means for moving storage platforms 140 between elevator car 25 and storage wells 200, such as hydraulic cylinders 230 each terminating in engagement mechanism 245, may be used. Hydraulic cylinders 230 horizontally shift platforms 140 between elevator car 25 and storage wells 200. Engagement mechanism 245, shown in detail in FIGS. 7C–7D, comprises engagement housing 255, engagement hook 260, lever arm 265 and solenoid 270. Engagement hook 260 is pivotally mounted on housing 250 and is rigidly secured to lever arm 265, which in turn connects with solenoid 270 attached to housing 250.

Figure 7C:
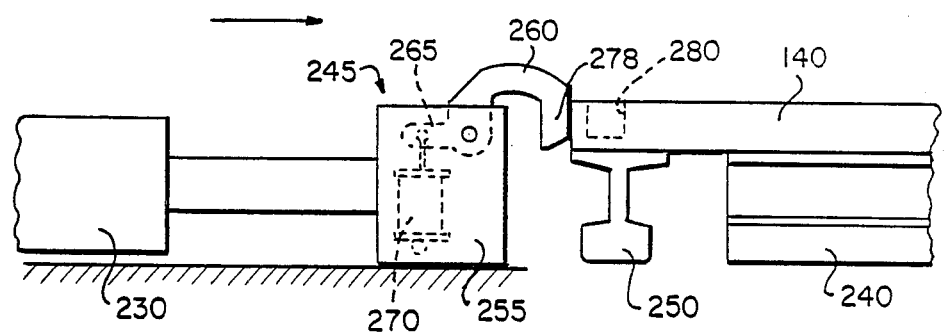
FIG. 7C is a detailed front view of an engagement mechanism, usable to move support platforms between an elevator and a storage space, shown in its disengaged position.

When solenoid 270 is not actuated, engagement hook 260 is positioned so that its free flat end 278 is vertically disposed. Consequently, when hydraulic cylinder 230 is actuated to push engagement mechanism 245 forward, it brings free end 278 of hook 260 into abutment with the topmost storage platform 140 in well 200, the platform 140 thus being pushed from the stack into the elevator car 25. The position of these elements in the pushing mode just described is illustrated in FIG. 7C. With platform 140 having been pushed onto elevator car 25, cargo may then be loaded thereon for transfer to the appropriate storage space C.

Figure 7D:
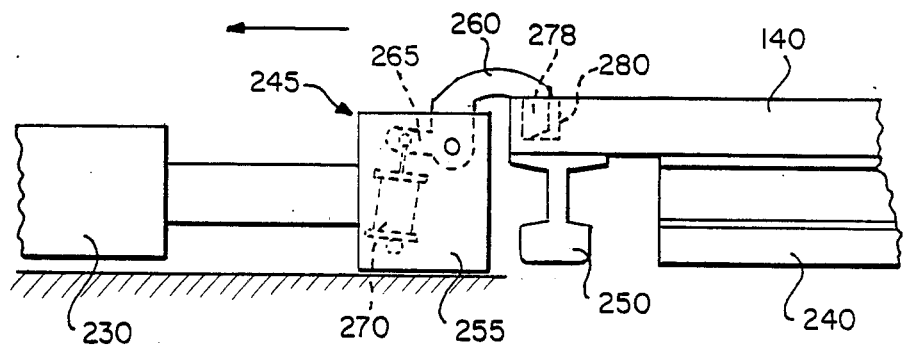
FIG. 7D is a view similar to FIG. 7C but showing the mechanism in an engaged operative position.

To reverse the process and return a storage platform 140 to the stack in storage well 200 from elevator car 25, solenoid 270 is actuated, drawing lever arm 265 toward solenoid 270 and pivoting hook 260 so that its free and 278 is raised. Hydraulic cylinder 230 is then extended so that engagement hook 260 is positioned over hook recess 280 located on storage platform 140. Solenoid 270 is then relaxed, causing lever arm 265 to be pushed away from solenoid 270, in turn causing hook 260 to drop into and engage hook recess 280. Thereafter, as hydraulic cylinder 230 is actuated to retract engagement mechanism 240 and exert a pulling force, storage platform 140 is moved from elevator car 25 onto the stack contained in storage well 200. The engaged position of hook 260 in hook recess 280 is illustrated in FIG. 7D. A further actuation of solenoid 270 followed by slight further retraction by hydraulic cylinder 230 releases engagement hook 260 from hook recess 280.

Although FIG. 1 shows only eight storage spaces C, it is entirely possible and feasible to increase the number of rows and aisles and thus vastly increase the number of available storage spaces. Furthermore, the structure of this invention does not necessarily require more than one elevator to serve the different levels of the storage building. For example, a level having 20 rows and 20 aisles has 399 potential storage spaces (400 positions less one to accomodate elevator shaft 20). For such an embodiment, assuming the elevator shaft is in position 2,2, a storage platform 140 could be moved from this position to storage space $C_{20,20}$ by successively actuating transverse roller support units 40 in aisle $A_2$ until platform 140 reaches space $C_{20,2}$ and then successively engaging the appropriate longitudinal roller support units 30 of row 20 until platform 140 is placed in space $C_{20,20}$.

While it is necessary that one space contiguous to the one holding platform 140 be free of any other platform, it is not necessary to leave any additional spaces empty or require additional elevator shafts for storage. As long as there is one empty storage space on a level, an additional platform may be moved into that empty space from elevator car 25 by appropriately shifting platforms 140 from space to space. For such shifting, it may be necessary to use elevator car 25 as a temporary empty storage space. The required actuation of drive wheels 60 of the appropriate roller support units to accomplish this shifting may be performed by a properly programmed computer operatively controlling the storage system of this invention. The computer may also keep track as to whether a storage space is occupied or not, and if occupied, the content of that space.

For relatively faster storage and retrieval, the storage spaces of one row and of one aisle may be kept empty. Thus, in the example previously given where a platform 140 is to be moved from elevator car 25 in position 2,2 to storage space $C_{20,20}$, let us assume that the storage spaces of row 3 and aisle 20 are left empty purposely and that all other spaces are occupied. To effectuate the desired transfer movement, the contents of all storage spaces from $C_{4,2}$ through $C_{20,19}$ are simultaneously shifted longitudinally so that the contents of space $C_{4,2}$ are shifted to space $C_{4,3}$, the contents of space $C_{5,3}$ are shifted to space $C_{5,4}$, and so on, so that all spaces of aisle $A_2$ are cleared. The platform 140 being shifted can be then moved from position 2,2 to space $C_{20,2}$. Next, the contents of all spaces from $C_{4,3}$ to $C_{20,20}$ can be shifted simultaneously and transversely so that the contents of $C_{4,3}$ are shifted to $C_{3,3}$, the contents of $C_{5,5}$ are shifted to $C_{4,5}$ and so on, to clear a path in row $R_{20}$ from space $C_{2,20}$ to space $C_{20,20}$. Platform 140 may then be moved in one operation to the destined space $C_{20,20}$ from space $C_{20,2}$.

The storage system herein described requires a minimum amount of unusable space. The only areas that cannot be devoted to storage are those needed for the roller support units and, if used, the platform storage wells. As can be seen from the drawings, however, the size of the roller support units is relatively so small that they will extend only minimally, if at all, above and below the structural beams of the building needed to support safely the cargo being stored. Further, the platform storage wells are of such modest size as to fit within the areas normally provided for housing the ventilation, heating and electrical equipment typically required by any conventional multi-level building. Also, storage spaces C may be adapted in size and height to meet minimally the requirements for a specific species fo cargo; since it is envisioned that this system is to be operated by automatic programmed computer remote control P.C. (FIGS. 2 and 7A), no extra space for human comfort or convenience need be provided. The efficiency of this storage system is maintained by the provision of a drive motor in each storage space, so that a breakdown in one storage space does not necessarily disable other spaces.

The storage system of this invention has a wide variety of uses, one of which is as a parking garage, where each storage platform 140 is adapted to carry and store an automobile, as described above. Such a parking garage might be conveniently and profitably located adjacent to a shopping center, office building, apartment complex or the like.

Another advantageous use of this storage system is in ships adapted to carry automobiles, wherein this invention can be employed within the hold of each ship to move the automobiles into storage spaces in the hold and retrieve them to a point within the hold to or from which the automobiles can be driven onto or off the ship.

This invention is also eminently suited for the storage of cargo containers in a ship's hold. When the system is used for this purpose, storage platforms 140 may be replaced by providing the bottoms of the cargo containers with rails 240, 250 or other suitable guides for support on, and movement by, drive wheels 60 of roller support units 30,40, The ship's cargo hoist system or, alternatively, a dockside hoist system may be used to move cargo containers between the dock and elevator car 25. The storage system is also useful for the temporary storage of the cargo containers at dockside pending the loading of the containers onto truck trailer chassis or into a ship's hold.

Other locations where the storage system of this invention can be used advantageously are in warehouses, factories and selling points, such as an automobile supply or hardware store, for the storage and retrieval of inventory items.

The concepts and some preferred embodiments of this invention have been described as illustrative examples of the best modes for carrying it out as now contemplated. Other embodiments, combinations or substitutions evident to those skilled in the art may be made without departing from the spirit and scope of this invention, which are limited and defined only by the ensuing claims.

What is claimed is;

1. A storage system for moving cargo elements to be stored into specified individual locations and retrieving them as desired, which comprises;
    a building structure having at least one level, each said at least one level having a plurality of contiguous substantially rectangular storage spaces;
    a plurality of movable storage platforms, each of said platforms being dimensioned to fit and be positioned in any of said plurality of storage spaces and each said platform comprising:
        a substantially planar horizontally disposed rectangular base;
        a first pair of guide rails mounted parallelly and spacedly on, and depending from, said base, said first pair of rails extending longitudinally along the front and rear edges of said base; and
        a second pair of guide rails mounted parallelly and spacedly on, and depending from, said base, said second pair of rails extending transversely along the side edges of said base;
    first means for supporting and moving horizontally one of said storage platforms and its cargo thereon, if any, in a longitudinal direction, said first means being mounted operatively in each of said plurality of storage spaces so as to be positioned to engage, support and move longitudinally said first pair of guide rails and hence said storage platform connected thereto selectively into one of said plurality of storage spaces for placement and storage therein and for later retrieval therefrom;

second means for supporting and moving said one of said storage platforms and its cargo thereon, if any, in a transverse direction, said second means being mounted operatively in each of said plurality of storage spaces so as to be positioned to engage, support and move transversely said second pair of guide rails and hence said storage platform connected thereto selectively into one of said plurality of storage spaces for placement and storage therein and later retrieval therefrom; and shift means for selectively bringing one of said supporting and moving means into and out of operative engagement and support of the corresponding said pair of guide rails, so that only one of said first and said second supporting and moving means is in supportive contact with one of said plurality of storage platforms at any time when said platform occupies the corresponding said storage space.

2. Storage system in accordance with claim 1, wherein said first and said second means for supporting and moving one of said plurality of storage platforms each comprise:

a pair of roller support units mounted within each said storage space, each of said roller support units comprising a plurality of support-drive wheels aligned edge to edge in a row extending longitudinally across in the case of said first supporting and moving means, and extending transversely in the case of said second support and moving means, said support-drive wheels of each said roller support unit being mounted on individual shafts journalled rotatably in a common support frame, each of said roller support units being positioned to support and move the corresponding one of said first and said second pair of guide rails in the direction said pair of guide rails extends; and motive means for selectively actuating each of said roller support units to rotate said support drive wheels thereof in unison and thereby to move the one of said support platforms positioned thereon in the direction dictated by the selected said roller support units.

3. Storage system in accordance with claim 2, wherein said shift means comprises one of said first and said second supporting and moving means in each said storage space having its corresponding said pair of roller support units mounted each on a plurality of powered jacks for selectively raising and lowering one of said first and said second supporting and moving means above and below the corresponding pair of roller support units of the other of said first and said second supporting and moving means and thereby into and out of supporting and moving contact with one of said storage platforms positioned in the corresponding said storage space.

4. Storage system in accordance with claim 3, wherein said building structure is multi-level and further comprises elevator means for raising and lowering any of said plurality of storage platforms and cargo thereon, if any, to a desired level.

5. Storage system in accordane with claim 4, wherein said elevator means comprises a plurality of elevator levels, said elevator levels being vertically spaced corresponding to the spacing of the levels of said building structure and being capable of carrying any of said storage platforms in each of said plurality of elevator levels, so that a plurality of building levels of said storage spaces may be serviced at one time.

6. Storage system in accordance with claim 4, wherein said elevator means comprises:

means for supporting and moving one of said plurality of storage platforms and its cargo, if any, in a longitudinal direction;

means for supporting and moving one of said plurality of storage platforms and its cargo, if any, in a transverse direction; and shift means for selectively bringing one of said supporting and moving means into and out of supportive and operative engagement of one of said plurality of storage platforms which occupies said elevator means.

7. Storage system in accordance with claim 4, further comprising platform storage means for accommodating said plurality of storage platforms when said platforms are not positioned in said plurality of storage spaces, said platform storage means comprising at least one storage well wherein said plurality of storage platforms may be placed in a vertical stack, means for raising and lowering said stack so that the topmost of said stored storage platforms may be horizontally aligned with at least one level of said building structure, and means for removing said topmost platform from, and returning any of said plurality of storage platforms to, said stack in said at least one storage well.

8. Storage system in accordance with claim 7, wherein all actuation of said motive means, said power jacks, said elevator means and said means for raising and lowering said stack are controlled automatically by a programmed computer, said computer also being capable of registering the identity and location of cargo, and the presence or absence of one of said plurality of storage platforms in any one of said plurality of storage spaces.

9. Storage system in accordance with claim 1, wherein each of said storage platforms further comprises said base, on which said first and said second pair of guide rails are dependingly mounted, being the bottom of a shipping container.

10. Storage system in accordance with claim 1, wherein each of said plurality of storage platforms is adapted to carry an automobile and further comprises means for engaging the wheels to prevent inadvertent movement of the automobile while supported and moved on said storage platform.

* * * * *